United States Patent [19]

Ando et al.

[11] Patent Number: 4,614,725

[45] Date of Patent: Sep. 30, 1986

[54] ALUMINA PORCELAIN COMPOSITION

[75] Inventors: Minato Ando; Masaaki Ito; Fumio Mizuno, all of Aichi, Japan

[73] Assignee: NGK Spark Plug Co., Ltd., Japan

[21] Appl. No.: 778,652

[22] Filed: Sep. 23, 1985

[30] Foreign Application Priority Data

Sep. 22, 1984 [JP] Japan .................................. 59-199099

[51] Int. Cl.$^4$ .............................................. C04B 35/46
[52] U.S. Cl. ..................................... 501/136; 501/153
[58] Field of Search ............................... 501/136, 153

[56] References Cited

U.S. PATENT DOCUMENTS 4,307,198 12/1981 Oda et al. ........................... 501/136

FOREIGN PATENT DOCUMENTS 57-95872 6/1982 Japan .................................. 501/136

Primary Examiner—Mark L. Bell
Attorney, Agent, or Firm—Sughrue, Mion, Zinn, Macpeak, and Seas

[57] ABSTRACT

An alumina porcelain composition is described, consisting of a main component made of from 96 to 99.5 mol % $Al_2O_3$ and from 4 to 0.5 mol % of $CaTiO_3$, and MgO as an auxiliary component, said MgO being present in an amount of not more than 1 part by weight per 100 parts by weight of the main component.

2 Claims, No Drawings

ALUMINA PORCELAIN COMPOSITION

FIELD OF THE INVENTION

The present invention relates to an alumina porcelain composition suitable for use in the microwave frequency range, particularly at frequencies higher than those in the X-band (which has a range of from 8 to 12.4 GHz). More particularly, the invention relates to an alumina porcelain composition having a high unloaded Q and a low specific inductivity in such microwave frequency range.

BACKGROUND OF THE INVENTION

Conventional dielectric porcelain materials include $ZrO_2$-$SnO_2$-$TiO_2$ and $BaO$-$TiO_2$ systems, as well as such systems in which part of the constituent elements are replaced by other elements, and the combination of a dielectric porcelain or glass having a positive temperature coefficient for specific inductivity with $TiO_2$ which has a negative temperature coefficient so as to control the temperature coefficient of the first component. However, these conventional dielectric porcelain materials have relatively high specific inductivities in the range of from 30 to 40.

As the operating range of dielectric oscillators has expanded to that of the microwave frequencies, there is an increasing demand for porcelain materials that have lower specific inductivities and which hence are easier to work.

Alumina porcelain holds much promise for use as a low specific inductivity material. One problem with alumina porcelain is that in spite of its relatively low specific inductivity ($\cong 10$), it has an extremely high temperature coefficient ($-60$ ppm/°C.) for resonating frequency.

The present inventors previously filed Japanese Patent Application No. 151589/84 wherein they described an alumina porcelain composition of the $Al_2O_3$-$CaTiO_3$-$SrTiO_3$ system that has excellent properties as a high frequency dielectric material. This composition has the compositional range defined by points A, B, C and D in the three-component composition diagram accompanying the specification of that application, wherein the points A, B, C and D represent the following molar fractions of $Al_2O_3$, $CaTiO_3$ and $SrTiO_3$:

|         | $Al_2O_3$ | $CaTiO_3$ | $SrTiO_3$ |
| ------- | --------- | --------- | --------- |
| Point A | 0.99      | 0.01      | 0         |
| Point B | 0.96      | 0.04      | 0         |
| Point C | 0.91      | 0.04      | 0.05      |
| Point D | 0.91      | 0.01      | 0.08      |

This alumina porcelain composition consists of a binary system of an alumina sinter and calcium titanate ($CaTiO_3$) or a ternary system of strontium titanate as combined with the binary system. The alumina sinter has a negative temperature coefficient for resonating frequency (said coefficient is hereunder abbreviated as $\tau_f$) whose absolute value is as great as 60 ppm/°C. while exhibiting a high unloaded Q, a small dielectric loss at high frequencies, as well as high heat conductivity, mechanical strength and chemical stability. The calcium titanate which is present in a small amount is formed from $CaO$ and $TiO_2$ and has a positive temperature coefficient ($\tau_f$) close to $+900$.

SUMMARY OF THE INVENTION

A principal object of the present invention is to further improve the unloaded Q of an alumina porcelain composition of the general type produced by the invention of Japanese Patent Application No. 151589/84.

In order to achieve this object, the invention provides an alumina porcelain composition consisting of a main component made of from 96 to 99.5 mol% $Al_2O_3$ and from 4 to 0.5 mol% of $CaTiO_3$, and MgO as an auxiliary component, said MgO being present in an amount of not more than 1 part by weight per 100 parts by weight of the main component. By combining the main component made of alumina and calcium titanate with magnesium oxide, and alumina porcelain composition having an increased unloaded Q and reduced specific inductivity can be obtained.

In accordance with the present invention, MgO in the composition is responsible for increasing the unloaded Q and lowering the specific inductivity.

The present invention is illustrated in greater detail with reference to the following Example, but the invention is not to be construed as being limited thereto.

EXAMPLE

(1) Preparation of Calcium Titanate

Commercial calcium carbonate (99.9% pure, 555 g), commercial titanium dioxide (99.9% pure, 445 g) and water (1,500 ml) were mixed in a 2 liter polyethylene vessel by agitation with alumina balls (2 kg, 99.99% pure, 20 mm$\phi$) at 84 rpm for 20 hours. The ground mixture was dried and passed through a 42 mesh sieve. The sieved powder was transferred into a 99.99% pure alumina crucible and calcined in an electric furnace at 1,300° C. for 1 hour. The resulting $CaTiO_3$ was passed through a 20 mesh sieve. The sieved powder was subjected to regrinding under the same conditions as used in the mixing step effected before the calcination. The reground powder was dried and sieved to obtain a powder of calcium titanate ($CaTiO_3$) all of which passed through 42 mesh openings.

(2) Blending

Alumina (99.99% pure commercial product; average grain size: 0.5 $\mu$m; 950 g) was mixed with the calcium titanate (prepared in (1)) incorporated to provide one of the molar ratios shown in Table 1 for the final products. To the mixture, magnesium carbonate (commercial $MgCO_3$, 99.9% pure) and 1,000 ml of water were added so that 100 parts by weight of the mixture would contain from 0 to 1.2 parts by weight (see Table 1) of MgO. The respective components together with alumina balls (99.99% pure, 20 mm$\phi$, 2 kg) were transferred into a 3 liter polyethylene vessel in which the components were agitated for 20 hours at 60 rpm. To each of the mixtures thus prepared, 30 g of a 33% aqueous solution of polyvinyl alcohol was added as an organic binder and mixed for 3 hours to form a slurry. The slurry was reduced to granules by spray drying with an atomizer (100 mm$\phi$, 7,200 rpm) at a gas temperature of 180° C.

The resulting granules (from 40 to 150 $\mu$m in diameter) were fed into a molding press wherein they were pressed into compacts (19 mm$\phi \times$ 10.5 mmL) at a pressure of 1,500 kg/cm$^2$. The compacts were sintered by holding them in an electric furnace at from 1,400° to 1,450° C. for 1 hour. The sintered compacts were worked into tablets (15 mm$\phi \times$ 8 mmL). Both ends of each tablet and its outer periphery were mirror-finished to respective surface roughnesses of 0.1 s and 0.5 s. The unloaded Q and specific inductivity $\epsilon$ of each sample was determined, and the results are shown in Table 1 below.

TABLE 1

| Main Sample No. | Al$_2$O$_3$/CaTiO$_3$ (in moles) | Character-istics | Auxiliary Samples | | | | | | | | | Main Components |
| | | | A | B | C | D | E | F | G | H | I | |
| | | | \multicolumn{9}{c}{MgO part by weight per 100 parts by weight of Al$_2$O$_3$—CaTiO$_3$)} | |
| | | | 0 | 0.05 | 0.1 | 0.2 | 0.3 | 0.5 | 0.8 | 1.0 | 1.2 | |
| 1 | 99.5/0.05 | Q | 6,700 | 8,000 | 11,000 | 12,200 | 11,300 | 9,500 | 9,000 | 8,300 | 6,700 | Within the Scope of the Invention |
| | | $\epsilon$ | 10 | 9.9 | 9.8 | 9.8 | 9.7 | 9.7 | 9.7 | 9.6 | 9.6 | |
| 2 | 99/1 | Q | 6,600 | 10,300 | 12,700 | 11,500 | 10,400 | 8,100 | 8,000 | 7,800 | 6,400 | Within the Scope of the Invention |
| | | $\epsilon$ | 10.5 | 10.5 | 10.5 | 10.4 | 10.4 | 10.4 | 10.2 | 10.0 | 9.9 | |
| 3 | 98/2 | Q | 6,400 | 9,800 | 12,300 | 10,900 | 9,600 | 8,000 | 7,000 | 7,000 | 6,200 | Within the Scope of the Invention |
| | | $\epsilon$ | 11.0 | 10.9 | 10.8 | 10.8 | 10.8 | 10.7 | 10.7 | 10.6 | 10.4 | |
| 4 | 97/3 | Q | 6,100 | 9,150 | 12,000 | 10,450 | 8,950 | 7,800 | 7,800 | 7,300 | 5,800 | Within the Scope of the Invention |
| | | $\epsilon$ | 11.6 | 11.6 | 11.6 | 11.4 | 11.2 | 11.1 | 10.8 | 10.6 | 10.4 | |
| 5 | 96/4 | Q | 5,300 | 8,500 | 11,700 | 10,000 | 8,300 | 7,700 | 7,300 | 7,100 | 6,300 | Within the Scope of the Invention |
| | | $\epsilon$ | 13.7 | 12.9 | 12.8 | 12.5 | 12.5 | 12.5 | 12.4 | 12.4 | 12.2 | |
| 6 | 94/6 | Q | 4,500 | 7,700 | 10,800 | 9,700 | 7,900 | 4,100 | 4,200 | 4,300 | 4,300 | Outside the Scope of the Invention |
| | | $\epsilon$ | 15.6 | 15.4 | 15.3 | 15.0 | 14.9 | 14.8 | 14.5 | 14.2 | 14.1 | |
| Auxiliary Component | | | Outside the Invention | \multicolumn{7}{c}{Within the Scope of the Invention} | | | Outside the Invention | |

Note:
The specific inductivity of each of the samples was measured by the dielectric cylindrical resonation method at a resonating frequency of 8 GHz.

As is clear from Table 1, the combinations of main sample Nos. 1 to 5 that had Al$_2$O$_3$/CaTiO$_3$ molar ratios within the range of from about 99.5/0.5 to 96/4 with auxiliary sample Nos. B to H, containing not more than 1.0 wt% of MgO, exhibited unloaded Q values of −7,000 or higher and specific inductivities ($\epsilon$) of 13 or below. These values indicate that the alumina porcelain composition of the present invention is very useful in applications in the microwave frequency range, particularly at frequencies higher than those in the X-band.

While the invention has been described in detail and with reference to specific embodiments thereof, it will be apparent to one skilled in the art that various changes and modifications can be made therein without departing from the spirit and scope thereof.

What is claimed is:

1. An alumina porcelain composition consisting of a main component made of from 96 to 99.5 mol% Al$_2$O$_3$ and from 4 to 0.5 mol% of CaTiO$_3$, and MgO as an auxiliary component, said MgO being present in an amount of 0.05 to not more than 1 part by weight per 100 parts by weight of the main component.

2. An alumina porcelain composition consisting of a main component made of from 97 to 99.5 mol% Al$_2$O$_3$ and from 3 to 0.5 mol% of CaTiO$_3$, and MgO as an auxiliary component, said MgO being present in an amount of from 0.1 to 0.8 part by weight per 100 parts by weight of the main component.

* * * * *